Dec. 15, 1925.

W. H. KRUMPELMANN 1,565,653

AUTOMOBILE TRAFFIC SIGNAL

Filed Oct. 11, 1922    2 Sheets-Sheet 1

Inventor
William H. Krumpelmann
By his Attorneys

Dec. 15, 1925.

W. H. KRUMPELMANN

AUTOMOBILE TRAFFIC SIGNAL

Filed Oct. 11, 1922   2 Sheets-Sheet 2

Inventor
William H. Krumpelmann
By his Attorneys

Patented Dec. 15, 1925.

1,565,653

UNITED STATES PATENT OFFICE.

WILLIAM H. KRUMPELMANN, OF ST. PAUL, MINNESOTA.

AUTOMOBILE TRAFFIC SIGNAL.

Application filed October 11, 1922. Serial No. 593,869.

*To all whom it may concern:*

Be it known that I, WILLIAM H. KRUMPELMANN, a citizen of the United States, residing at St. Paul, in the county of Ramsey and State of Minnesota, have invented certain new and useful Improvements in Automobile Traffic Signals; and I do hereby declare the following to be a full, clear, and exact description of the invention, such as will enable others skilled in the art to which it appertains to make and use the same.

My invention provides a highly improved traffic signal that is applicable as an attachment to automobiles or motor-propelled vehicles; and generally stated, the invention consists of the novel devices and combinations of devices hereinafter described and defined in the claim.

In its most complete embodiment, the signal device involves means for flashing or producing visual signals, indicating the following actions of the automobile, towit: right turn, left turn, start or go ahead, back up, and stop. The right and left turn indicators, in this preferred arrangement, are operated, at will, by switches within reach of the driver and advisably applied on the steering wheel. The go ahead and back up indicators are automatically controlled by a selective switch that is connected to and automatically operated by the shift lever of the transmission mechanism; and the arrangement is such that when said shift lever is in neutral position, the circuits to both of said indicating devices will be broken; when the lever is set for low, intermediate or high forward motion of the machine, the circuit of the start or go ahead indicator will be closed; and when said shift lever is set for reverse or backing up of the machine, the circuit to the back up indicating device will be closed. The controlling circuit of the start or go ahead indicating device is connected through a switch that is closed when the clutch lever is released and the clutch set for transmitting action, but which switch will be opened when the clutch lever is moved to release the clutch; and the circuit of the stop indicating device is connected to a normally open switch that is arranged to be closed when the brake lever is removed from normal position to set the brakes.

In the accompanying drawings, which illustrate the invention, like characters indicate like parts throughout the several views.

Referring to the drawings.

Figure 1:
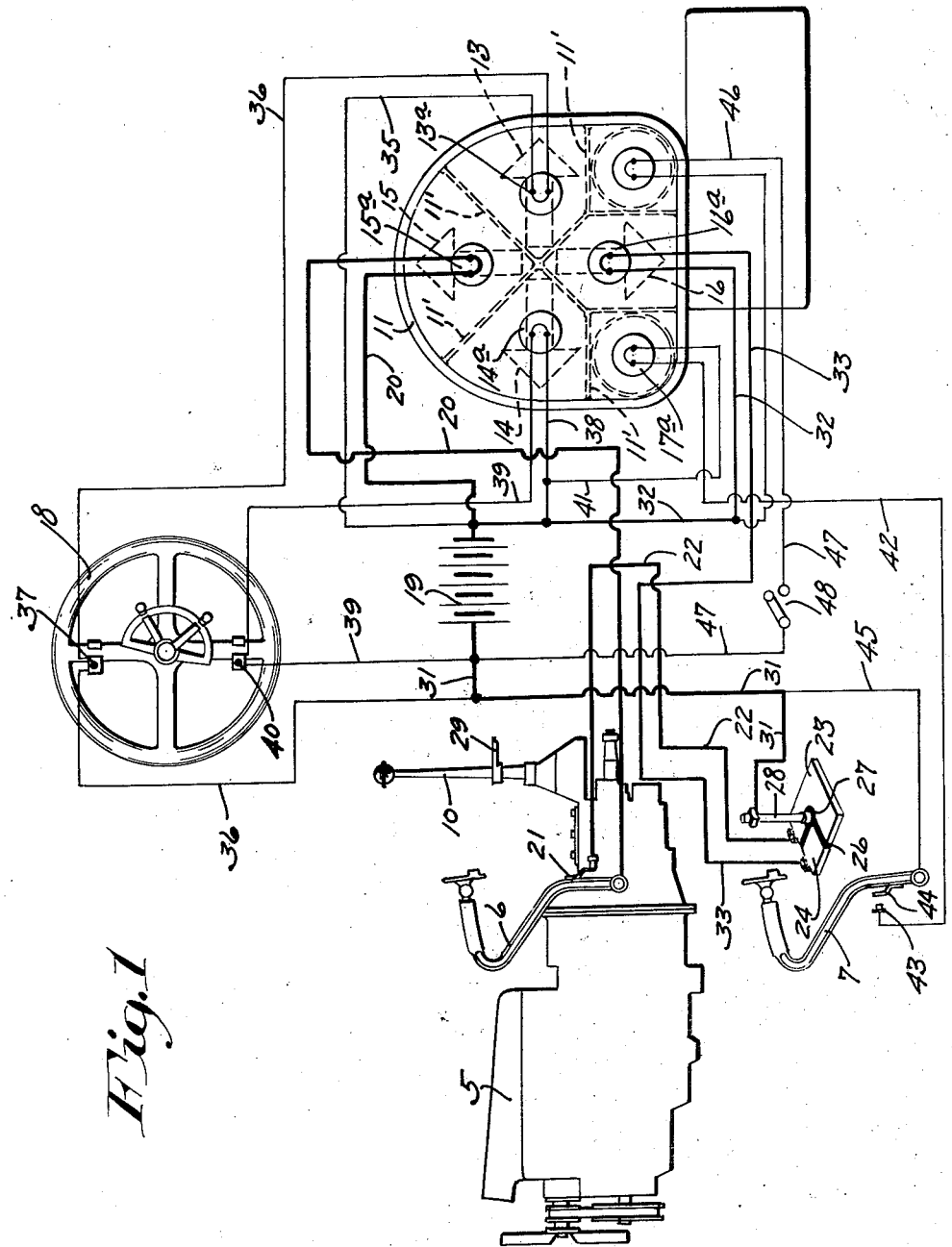
Fig. 1 is a diagrammatic view illustrating the wiring and switch mechanism of the signal system.

Of the parts of the automobile, it is only desirable for the purposes of this case to particularly note the running gear 4, the engine 5, the clutch lever 6, the brake lever 7, the steering wheel 8, the selective transmission mechanism 9, and the shift lever 10, which parts may be of the usual or any suitable construction, the operation of which is well understood to all persons familiar with automobiles.

The case 11 of the signal device is preferably applied to and supported by the left-hand rear fender and the license plate 12 may be secured to the same fender directly under said case, although the latter feature is not important.

Figure 2:
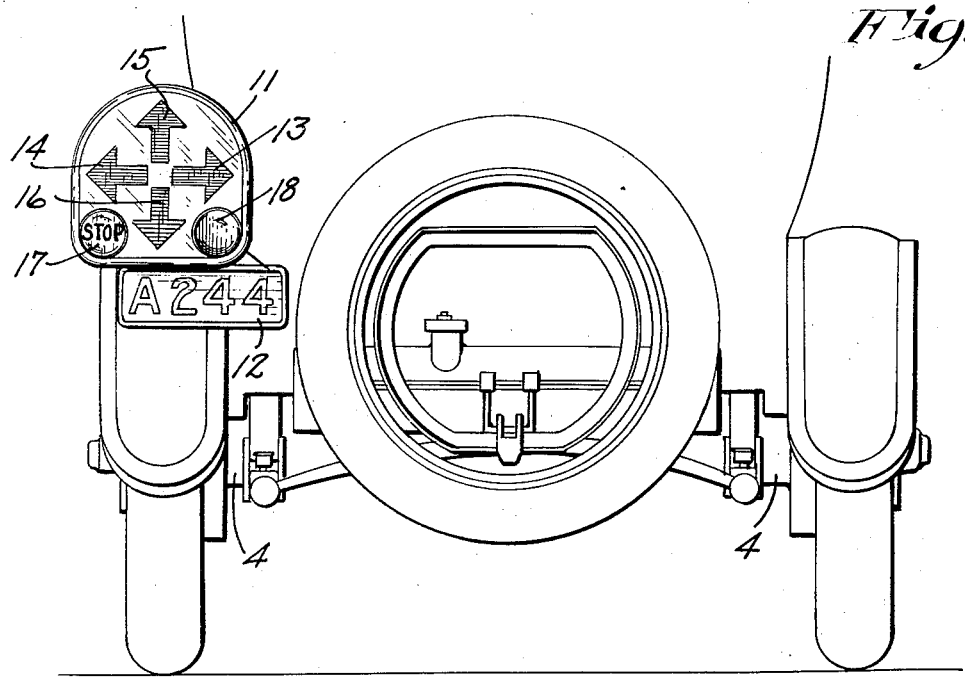
Fig. 2 is a rear elevation showing a portion of an automobile with the traffic signal applied thereto.

In its rear face, the case 11 has transparent or translucent illuminable devices or characters for indicating right turn, left turn, go ahead, back up, and stop, and also preferably has the usual tail light. The indicators for left turn, right turn, go ahead, and back up, are preferably arrow-shaped openings 13, 14, 15 and 16, covered with red glass or the like and pointing in the different directions shown clearly in Fig. 2. The stop indicator is preferably a lens or round glass plate 17 on which the letters "Stop" are marked. The tail light 18 is preferably a small ordinary red glass lens or plate. The case 11, at its interior, is provided with partitions 11' that afford a compartment for each of the six above noted different indicating devices, and for the said devices and the corresponding compartments are electric light bulbs marked with the same numerals with the exponent $a$ added thereto. All of several signalling light bulbs above noted are arranged to be connected through a source of energy, such as a battery 19 that may be the storage battery of the automobile or car. This battery, at one side, is connected by a lead 20. The light bulb $15^a$ is connected in a lead 20 that extends from one side of the battery 19 to the clutch lever 6.

This bulb circuit is continued to a switch contact 21, with which the clutch lever 6 is normally engaged, and thence through a lead 22 to a contact plate 23. The contact plate 23 is shown as squared but might be of any suitable form, the important fact being that it has a circumferential extent representing three positions of the shift lever 10, towit: low, intermediate and high. Otherwise stated, said plate 23 extends circumferentially through three quadrants of a circle, and the fourth quadrant is formed by a smaller plate 24 that lies in the same plane therewith.

Figure 3:
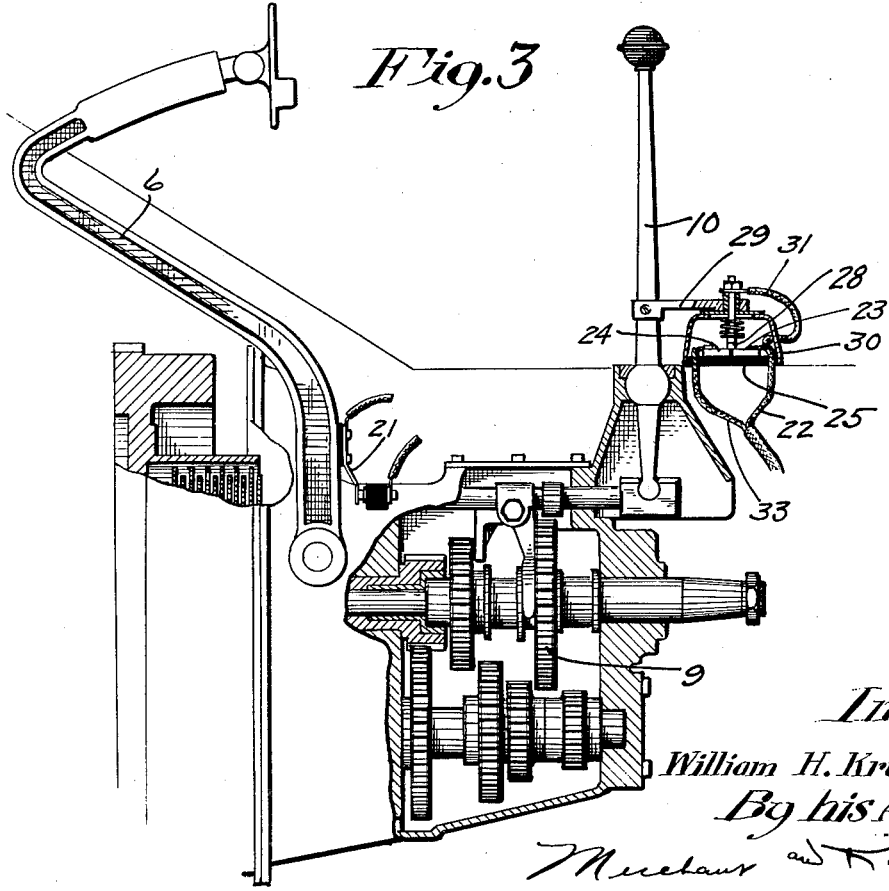
Fig. 3 is a fragmentary vertical section illustrating the manner in which certain of the switches are connected to the shift lever and clutch lever of the automobile.

The two plates 23 and 24 are secured on an insulating plate 25 that is rigidly supported immediately adjacent to the fulcrum of the shift lever 10, (see particularly Fig. 3). The insulating material of the plate 25 extends up between the two plates 23 and 24, as shown at 26 in Fig. 1, and, at the center of the plate, laterally offset from but adjacent to the vertical axis of the lever 10, there is a circular insulating zone 27. A downwardly spring-pressed wiper-acting contact bolt 28 works over the plates 23 and 24 and insulation 26 and 27. This contact bolt is carried by an offset arm 29 rigidly secured to and projecting from the shift lever 10, as best shown in Fig. 3. Preferably, a hood 30 is secured to the insulating plate 25 and is provided with a large central opening in its top that permits free lateral oscillations of the contact bolt or brush 28 as required to perform its function hereinafter described. Here it should be noted that the relative arrangement of parts just described is such as to cause the contact bolt 28 to rest upon the central insulating zone 27 when and only when the shift lever 10 is in its neutral position, said neutral position of said lever usually being a vertical position.

Again directing attention to Fig. 1, it will now be noted that the contact bolt 28 is electrically connected by a lead wire 31 back to that side of the battery 19 that is opposite to the point of connection to said battery of the lead 20. Here it is now evident that the light bulb 15ª, which is back of the "Go ahead" indicating arrow 15, will be in a closed circuit whenever the gear shift lever 10 is moved from neutral position to low, intermediate, or high gear position, providing, however, that the clutch lever 6 is then in normal position so as to close said circuit through the switch contact 21. Obviously, in any of the three positions of the shift lever just noted, the light bulb 15 will be out of circuit whenever the clutch lever 6 is moved from its normal or clutch-setting position shown in Fig. 1 forward into a clutch-releasing position so as to break the circuit at the contact 21.

The light bulb 16ª, which is back of the "Back up" indicator arrow 16, is connected by a lead 32 to one side of the battery 19 and by a lead 33 to the relatively small contact plate 24, so that the circuit through said bulb 16ª will be closed when the shift lever 10 is moved to a reverse position so as to thereby move the contact bolt or brush 28 onto said plate 24. Here it will be noted that under this operation, as under the operation for "Go ahead" indication, the return of the current from the contact bolt 28 to the battery 19 is through the lead wire 31. It is now evident that the "Back up" indicating device will be illuminated whenever the shift lever is moved into a position for reversal of the transmitting power so as to cause the car to back up.

Again by reference to Fig. 1, it will be seen that light bulb 13ª, which is back of the "Right turn" indicating arrow 13, is connected to one side of the battery 19 through a lead wire 35 and is connected to the opposite side of said battery through a lead 36. In the lead 36 is a normally open switch 37, preferably of the push button type, applied to one arm of the steering wheel 8. Obviously, the "Turn to the right" indication may be flashed, at will, by pressing the button of the switch 37.

The light bulb 14ª, which is back of the "Turn to the left" indicating arrow 14, is connected to one side of the battery 19 through a lead wire 38 and to the other side of the battery 19 through a lead wire 39. In the lead 39, is interposed a normally open switch 40, which is preferably of the push button type, applied to one arm of the steering wheel 8. As is evident, the "Turn to the left" indication may be flashed, at will, by pressing the button of the switch 40.

The light bulb 17ª that is back of the "Stop" indicating device 17, is connected to one side of the battery 19 through a lead wire 41 and the other side of said bulb is connected by a lead wire 42 to a contact 43 of a normally open switch, the movable contact 44 of which is carried by the brake lever 7. The brake lever 7 is connected back to the other side of the battery 19 through a lead wire 45 and a part of the wire 31. Obviously, the "Stop" indication will be flashed whenever the brake lever 7 is moved from its normal position into a position to set the brakes.

The hub 18ª of the tail light 18 is connected to one side of the battery 19 through a lead wire 46 and a portion of the wire 32, while the other side of said bulb is connected to the opposite side of said battery through a lead wire 47 and a portion of the wire 31. In the lead wire 47 is interposed a switch 48 that is adapted to be closed to throw the tail light into action and to be opened to cut said tail light out of circuit.

From the foregoing, it is evident that by very simple and extremely efficient means, the various signals that should be given by the driver of an automobile in manipulating a machine on roads and especially on heavily traveled city roads, will be or may be given, either automatically or at will, by the operator of the automobile or motor-propelled vehicle.

What I claim is:

The combination with a motor-propelled vehicle equipped with a selective gear transmission having a gear shift lever, of primary and secondary contact plates insulated from each other, the former located in three and the latter in one quadrant of a circle, and a contact member carried by said shift lever and movable over said primary and secondary contact plates but being out of electrical contact with both thereof when said shift lever is in neutral position, said movable contact being thrown into engagement with said primary contact plate when said shift lever is in low, intermediate or high position and being engageable with said secondary contact plate when said lever is in position for reverse.

In testimony whereof I affix my signature.

WILLIAM H. KRUMPELMANN.